(12) United States Patent
Chen et al.

(10) Patent No.: US 6,699,588 B2
(45) Date of Patent: Mar. 2, 2004

(54) MEDIUM WITH A NINB SEALING LAYER

(75) Inventors: Qixu (David) Chen, Milpitas, CA (US); Liji Huang, San Jose, CA (US); Charles Leu, Fremont, CA (US); Rajiv Yadav Ranjan, San Jose, CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 21 days.

(21) Appl. No.: 09/559,347

(22) Filed: Apr. 27, 2000

(65) Prior Publication Data

US 2002/0064690 A1 May 30, 2002

Related U.S. Application Data

(60) Provisional application No. 60/145,490, filed on Jul. 22, 1999.

(51) Int. Cl.[7] .................................................. G11B 5/65
(52) U.S. Cl. ..................... 428/611; 428/663; 428/668; 428/333; 428/694 TS; 427/129; 204/192.2
(58) Field of Search ....................... 428/611, 663, 428/668, 333, 694 TS; 427/129, 130, 131; 204/192.2

(56) References Cited

U.S. PATENT DOCUMENTS

| 4,863,810 | A |   | 9/1989  | Bhattacharya et al. |            |
|-----------|----|---|---------|---------------------|------------|
| 5,480,733 | A | * | 1/1996  | Okumura et al.      | 428/694 T  |
| 5,733,370 | A | * | 3/1998  | Chen et al.         | 117/105    |
| 5,741,560 | A |   | 4/1998  | Ross                |            |
| 5,874,376 | A | * | 2/1999  | Taguchi et al.      | 428/694 SG |
| 5,980,997 | A | * | 11/1999 | Ross et al.         | 427/130    |
| 6,103,404 | A | * | 8/2000  | Ross et al.         | 428/680    |
| 6,120,890 | A | * | 9/2000  | Chen et al.         | 428/332    |
| 6,143,375 | A | * | 11/2000 | Ross et al.         | 427/555    |
| 6,183,828 | B1 | * | 2/2001  | Starcke et al.      | 369/283    |
| 6,187,441 | B1 | * | 2/2001  | Takeuchi et al.     | 428/410    |
| 6,332,338 | B1 | * | 12/2001 | Hashimoto et al.    | 65/29.21   |
| 6,416,881 | B1 | * | 7/2002  | Huang et al.        | 204/192.2  |

OTHER PUBLICATIONS

Mahvan, N., Ziera, E., and Eltoukhy, A., IEEE Trans. Mag., 29(6), 1993, 3691-3693.*

* cited by examiner

Primary Examiner—Paul Thibodeau
Assistant Examiner—Kevin M. Bernatz
(74) Attorney, Agent, or Firm—Morrison & Foerster LLP

(57) ABSTRACT

Sputter-deposited amorphous NiNb films on glass or glass-ceramic substrates have good adhesion with the substrates, and reduce lithium migration significantly. Longitudinal magnetic recording media deposited on oxidized NiNb sealing layers have very good magnetic recording performances and are suitable for high density recording application.

13 Claims, 6 Drawing Sheets

A longitudinal or perpendicular recording disk medium in accordance with an embodiment of the present invention.

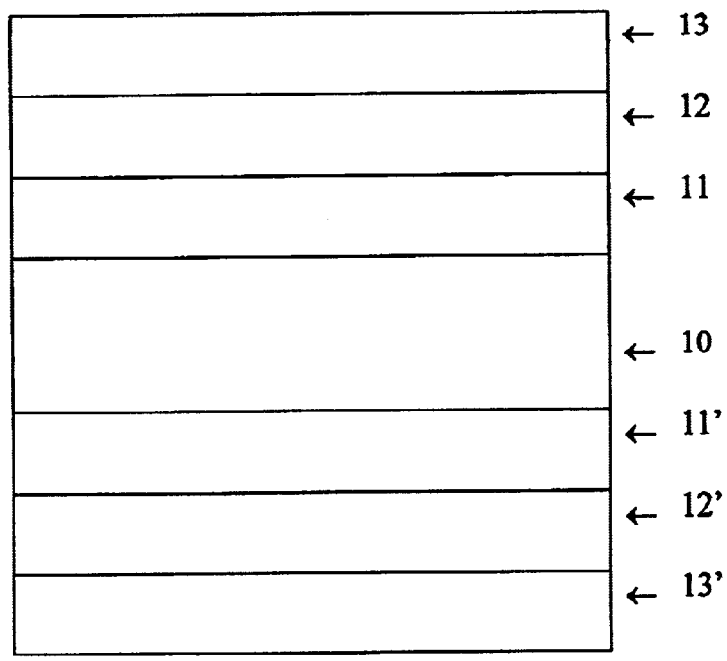
Fig. 1: A conventional longitudinal recording disk medium (prior art).

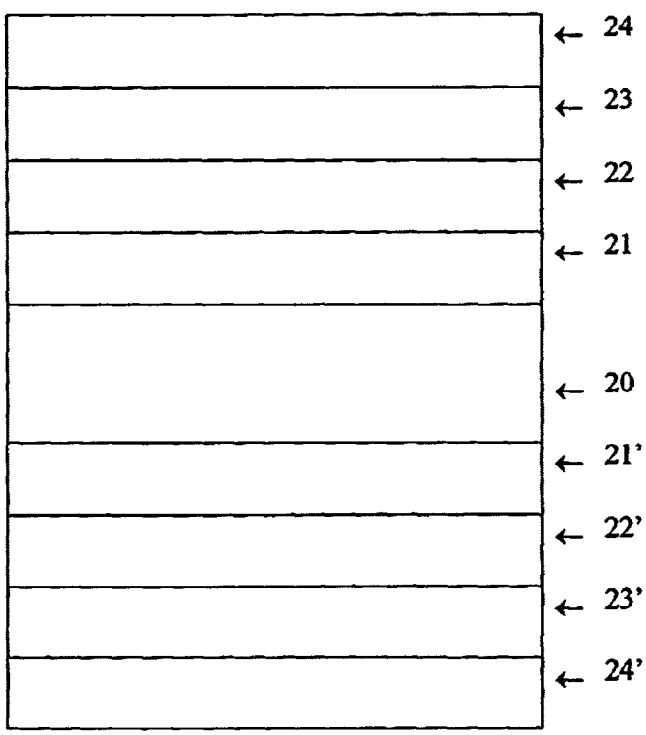
Fig. 2: A longitudinal or perpendicular recording disk medium in accordance with an embodiment of the present invention.

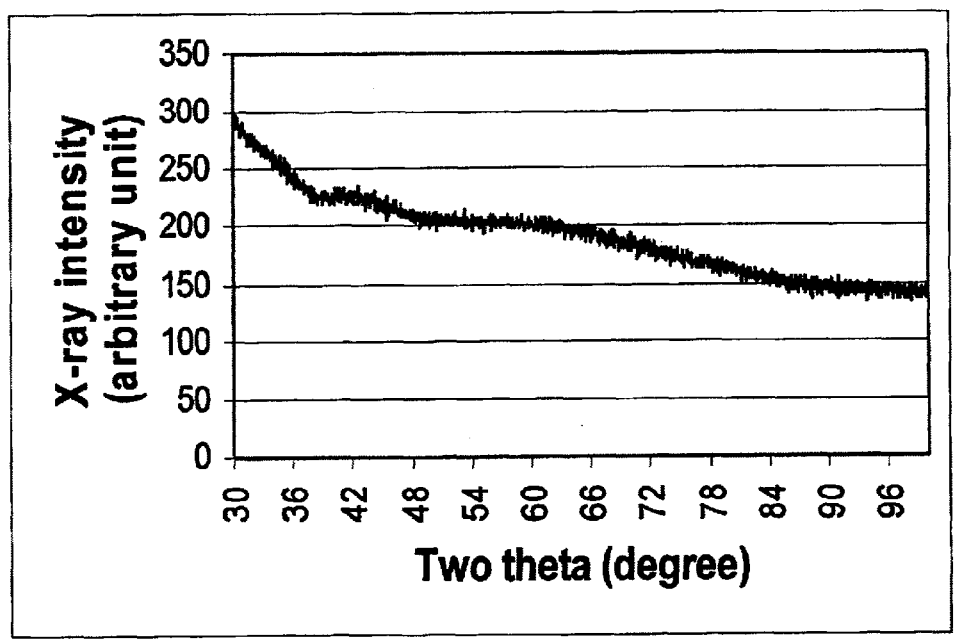
Fig. 3: X-ray diffraction pattern of 400 Å NiNb films deposited on glass substrates.

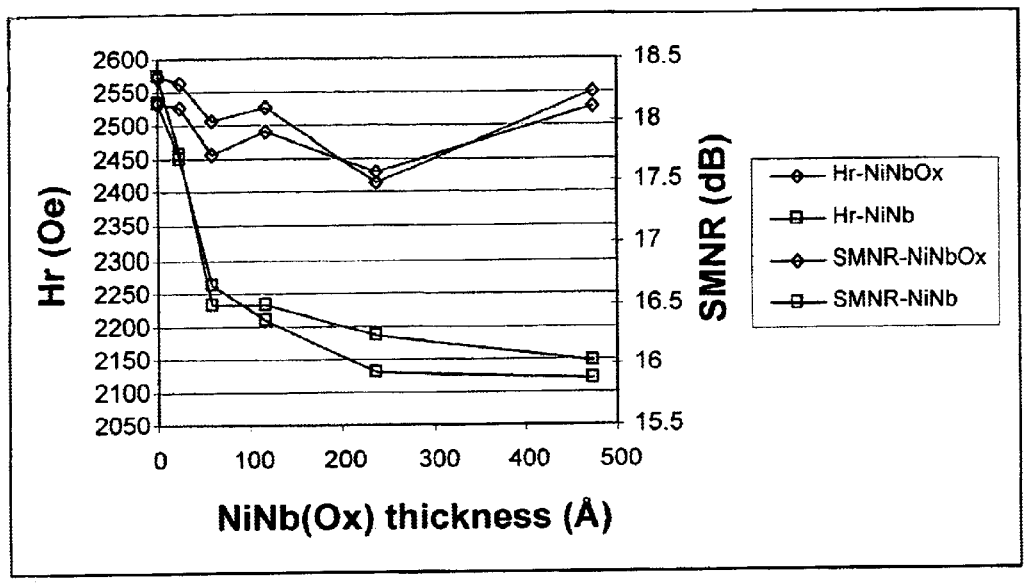
Fig. 4: Hr and SMNR dependence on NiNb thickness of the media with surface-oxidized NiNb sealing layers (NiNbOx) and non-oxidized NiNb sealing layers.

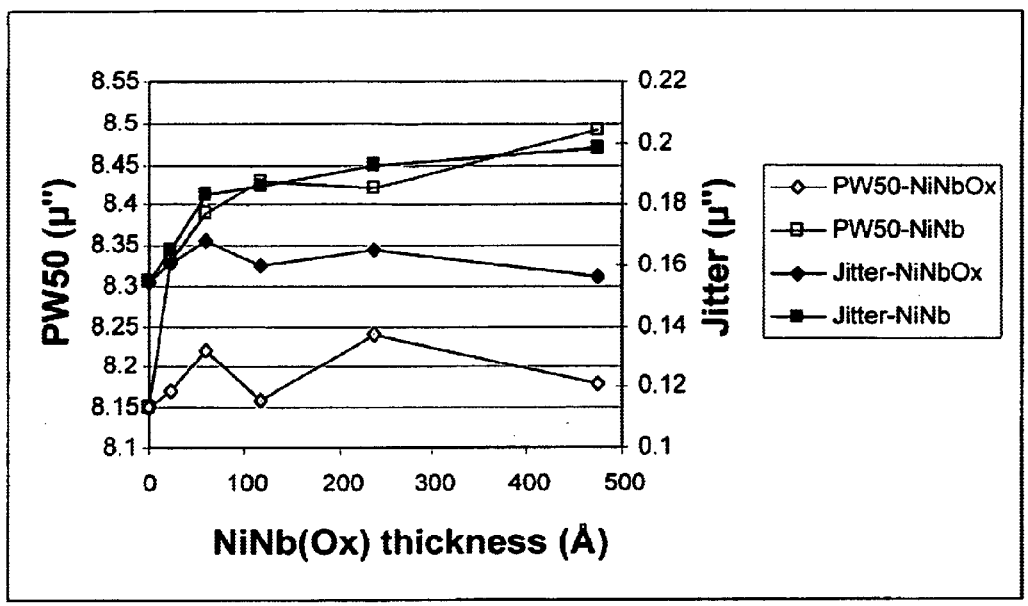
Fig. 5: $PW_{50}$ and jitter dependence on NiNb thickness of the media with surface-oxidized NiNb sealing layers (NiNbOx) and non-oxidized NiNb sealing layers.

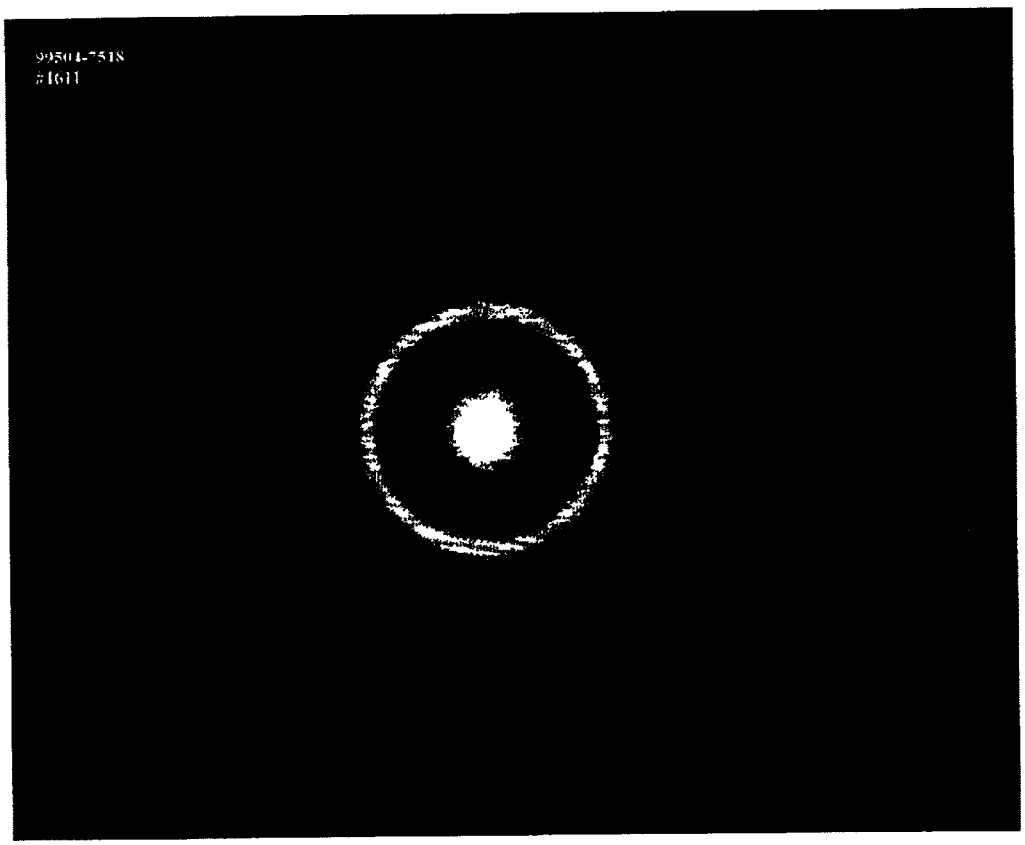
Fig. 6: TEM diffraction pattern of 400Å NiNb films deposited on glass substrates.

MEDIUM WITH A NINB SEALING LAYER

RELATED APPLICATIONS

This application claims priority from provisional 60/145,490 filed Jul, 22, 1999, entitled "MEDIUM WITH A NiNb SEED LAYER," the entire disclosure of which is hereby incorporated herein by reference.

TECHNICAL FIELD

This invention relates to a magnetic medium, such as a thin film magnetic recording medium, and the method of manufacturing the medium. The invention has particular applicability to a magnetic recording medium exhibiting low noise, high coercivity and suitable for high-density longitudinal and perpendicular recording.

BACKGROUND ART

The requirements for high areal density impose increasingly greater requirements on magnetic recording media in terms of coercivity, remanent squareness, low medium noise and narrow track recording performance. It is extremely difficult to produce a magnetic recording medium satisfying such demanding requirements, particularly a high-density magnetic rigid disk medium for longitudinal and perpendicular recording. The magnetic anisotropy of longitudinal and perpendicular recording media makes the easily magnetized direction of the media located in the film plane and perpendicular to the film plane, respectively. The remanent magnetic moment of the magnetic media after magnetic recording or writing of longitudinal and perpendicular media is located in the film plane and perpendicular to the film plane, respectively.

The linear recording density can be increased by increasing the coercivity of the magnetic recording medium. However, this objective can only be accomplished by decreasing the medium noise, as by maintaining very fine magnetically noncoupled grains. Medium noise is a dominant factor restricting increased recording density of high-density magnetic hard disk drives. Medium noise in thin films is attributed primarily to large grain size and intergranular exchange coupling. Therefore, in order to increase linear density, medium noise must be minimized by suitable microstructure control.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material which comprise a mixture of amorphous and crystalline materials, and ceramic materials. Glass-ceramic materials do not normally exhibit a crystalline surface. Glasses and glass-ceramics generally exhibit high resistance to shocks. The use of glass-based materials, such as glass-ceramic materials, is disclosed by Hoover et al., U.S. Pat. No. 5,273,834.

A conventional longitudinal recording disk medium is depicted in FIG. 1 and typically comprises a non-magnetic substrate 10 having sequentially deposited on each side thereof an underlayer 11, 11', such as chromium (Cr) or Cr-alloy, a magnetic layer 12, 12', typically comprising a cobalt (Co)-base alloy, and a protective overcoat 13, 13', typically containing carbon. Conventional practices also comprise bonding a lubricant topcoat (not shown) to the protective overcoat. Underlayer 11, 11', magnetic layer 12, 12', and protective overcoat 13, 13', are typically deposited by sputtering techniques. The Co-base alloy magnetic layer deposited by conventional techniques normally comprises polycrystallites epitaxially grown on the polycrystal Cr or Cr-alloy underlayer. A conventional perpendicular recording disk medium is similar to the longitudinal recording medium depicted in FIG. 1, but does not comprise Cr-containing underlayers.

Conventional methods for manufacturing longitudinal magnetic recording medium with a glass or glass-ceramic substrate comprise applying a seed layer between the substrate and underlayer. A seed layer seeds the nucleation of a particular crystallographic texture of the underlayer.

Longitudinal magnetic recording media with glass or glass-ceramic substrates are commercially available from different manufacturers with different seed layer materials to reduce the effect of high thermal emissivity of such glass and glass-ceramic substrates, and to influence the crystallographic orientation of subsequently deposited underlayers and magnetic layers. Pre-coat on glass substrates also facilitates laser texturing and mechanical texturing process. Such conventional seed layer materials also include nickel-phosphorous (Ni—P) which is typically sputter deposited on the surface of the glass-ceramic substrate at a thickness of 500 Å. Sputtered NiP films on glass or glass-ceramic substrates were reported in the literature for the control of crystallographic orientation of the longitudinal magnetic media and the enhancement of coercivity (for example, Hsiao-chu Tsai et al., "The Effects of $Ni_3P$-sublayer on the Properties of CoNiCr/Cr Media Using Different Substrates," IEEE Trans. on Magn., Vol. 28, p. 3093, 1992).

Conventional longitudinal magnetic recording media comprising a glass or glass-ceramic substrate having NiP sputtered thereon also comprise, sequentially deposited thereon, a Cr or Cr-alloy underlayer at an appropriate thickness, e.g., about 550 Å, a magnetic layer such as Co—Cr-platinum (Pt)-tantalum (Ta) at an appropriate thickness, e.g., 200 Å, and a protective carbon overcoat at an appropriate thickness, e.g., about 75 Å. Conventional Cr-alloy underlayers comprise vanadium (V), titanium (Ti), tungsten (W) or molybdenum (Mo). Other conventional magnetic layers are CoCrTa, CoCrPtB, CoCrPt, CoCrPt-TaNb and CoNiCr.

The seed layer, underlayer, and magnetic layer are conventionally sequentially sputter deposited on the glass or glass-ceramic substrate in an inert gas atmosphere, such as an atmosphere of pure argon. A conventional carbon overcoat is typically deposited in argon with nitrogen, hydrogen or ethylene. Conventional lubricant topcoats are typically about 20 Å thick.

Longitudinal magnetic films exhibiting a bicrystal cluster microstructure are expected to exhibit high coercivity, low noise and high remanent squareness. In U.S. Pat. No. 5,830,584, a magnetic medium was disclosed comprising a glass or glass-ceramic substrate and a magnetic layer exhibiting a bicrystal cluster microstructure. The formation of a bicrystal cluster microstructure is induced by oxidizing the surface of a seed layer so that the underlayer subsequently deposited thereon exhibits a (200) crystallographic orientation which, in turn, induces a bicrystal microstructure in a magnetic alloy deposited and epitaxially grown on the underlayer.

U.S. Pat. No. 5,733,370 discloses a method of manufacturing a magnetic recording medium comprising a glass or glass-ceramic substrate and a magnetic layer exhibiting a bicrystal cluster microstructure. The disclosed method comprises sputter depositing a NiP seed layer on a glass or glass-ceramic substrate and subsequently oxidizing the deposited NiP seed layer. The oxidized upper seed layer surface induces the subsequently deposited underlayer to exhibit a (200) crystallographic orientation which, in turn, induces the magnetic alloy layer deposited and epitaxially grown on the underlayer to exhibit a bicrystal cluster microstructure. The magnetic recording media disclosed in U.S. Pat. Nos. 5,733,370 and 5,830,584 exhibit high coercivity, low magnetic remanence (Mr)×thickness (t) and low noise, thereby rendering them particularly suitable for longitudinal recording.

In co-pending application Ser. No. 09/152,324, the adhesion between a seed layer, particularly a NiP seed layer, and a non-conventional substrate, was improved by providing an adhesion enhancement layer, such as Cr or a Cr alloy, between the substrate and the seed layer, with an additional benefit in recording performance obtained by surface oxidizing the seed layer.

Assignee's pending U.S. patent application Ser. No. 09/186,074, entitled "Magnetic thin film medium comprising amorphous sealing layers for reduced lithium migration," discloses a method which can be used for reducing corrosion of the magnetic recording medium on glass by applying NiP layer on the substrate.

The entire disclosures of co-pending applications Ser. Nos. 09/186,074 and Ser. No. 09/152,324 and U.S. Pat. Nos. 5,733,370 and 5,830,584, are incorporated by reference herein.

Some glasses and glass-ceramic materials have lithium (Li) and sodium (Na) transitional elements to lower the glass transition temperature of the material. Lowering the glass transition temperature makes forming of the glass products easier. A large amount of Li, e.g., about 0.5 to about 32 wt. % of $Li_2O$ is incorporated into $SiO_2$ matrix in ionic form and bonds in an ionic and secondary fashion in the $SiO_2$ networks. The nature of the bonding enables leaching of the Li ions from the glass matrix. A typical magnetic recording medium comprises a CoCr alloy film as a recording layer. The media noise is mainly due to the exchange coupling between the CoCr alloy grains. In order to enhance the Cr segregation into CoCr alloy grain boundary to reduce the intergranular exchange coupling, high temperature sputtering is widely used in the magnetic rigid disc manufacturing industries. The typical substrate temperature during sputtering is about 200° C. to about 250° C. It typically takes several minutes to sputter deposit the plurality of films in a pass-by in-line sputtering system. Because the melting point of pure Li is 181° C., the driving force for Li diffusion in the process with so high temperature for so long a time is very large.

The media used in perpendicular magnetic recording do not usually comprise Cr alloy underlayers. Even for the media used in longitudinal magnetic recording, the Cr alloy underlayers can not seal the Li or prevent leaching.

It is well known that sputtered Cr and Cr alloy underlayers of thin film rigid discs exhibit an aggregate of faceted conical columns (Agarwal, S., "Structure and Morphology of RF Sputtered Carbon Overlayer Films," IEEE Trans., Magn., MAG-21, P. 1527, 1985.) The crystalline grain boundaries of the Cr and Cr alloy films are high diffusion-rate paths. Therefore, the longitudinal magnetic recording rigid discs with Cr or Cr alloy underlayers directly deposited on Li-containing glass or glass-ceramic substrates and the perpendicular recording discs on glass or glass-ceramic substrates often suffer from Li corrosion problems. The Li leaching from the substrates further promotes Co leaching from the magnetic layer of the rigid magnetic discs, and makes the corrosion problems even worse. Corrosion products will be picked up by the recording head causing smearing on the recording head and disc surface, resulting in increased stiction and eventual drive failure.

There exists a need for technology enabling the use of glass and glass-ceramic substrates containing large Li in magnetic recording media while preventing Li migration from the substrate.

SUMMARY OF THE INVENTION

During the course of the present invention, it was found that amorphous NiP seed layer is easy to transfer to crystalline structure and destroy tribological and magnetic performances of magnetic recording medium. The adhesion between NiP film and glass substrates is not good also. Therefore, applicants recognized that there is a need to find sealing layers, which enhance magnetic recording performances, reduce lithium migration, and have good adhesion on glass and glass-ceramic substrates.

The present invention is a magnetic recording medium comprising a glass substrate containing a large amount of Li which does not significantly migrate to the surface of the recording medium.

Another advantage of the present invention is a method of manufacturing a magnetic recording medium comprising a glass or glass-ceramic substrate containing a large amount of Li which does not significantly migrate to the surface of the medium.

Additional advantages and other features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by a magnetic recording medium comprising longitudinal or perpendicular magnetic recording medium comprising a substrate comprising Li, a sealing layer comprising NiNb, preferably amorphous NiNb, and a magnetic layer, wherein the sealing layer substantially prevents the migration of Li from the substrate.

Another embodiment of this invention is a longitudinal or perpendicular magnetic recording medium comprising a substrate comprising Li, a sealing means for substantially preventing the migration of Li from the substrate, and a magnetic layer. Embodiments of the sealing means include a sputter deposited layer of a sealing material such as NiNb, preferably amorphous NiNb, that substantially prevents the migration of Li from the substrate, which may be made of glass or glass-ceramic materials.

Another aspect of the present invention is a method comprising sputter depositing a sealing layer comprising NiNb, preferably amorphous NiNb, on substrate comprising Li and sputter depositing a magnetic layer on the sealing layer, wherein the sealing layer substantially prevents migration of Li from the substrate.

Embodiments include sputter depositing an NiNb, preferably amorphous NiNb, sealing layer from a target containing at least 12 wt. % of Nb, preferably at least 37 wt. % of Nb, wherein the NiNb, preferably amorphous NiNb, sealing layer optionally comprises boron (B), tungsten (W), tantalum (Ta), Zirconium (Zr) and phosphorus (P), and oxidizing the surface of the NiNb, preferably amorphous NiNb, sealing layer for improved performance.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the present invention. The drawings and description are to be regarded as illustrative in nature, and not as restrictive.

BRIEF DESCRIPTION OF DRAWINGS

FIG. 1 schematically shows a conventional magnetic recording medium structure.

FIG. 2 schematically shows a magnetic recording medium structure in accordance with an embodiment of the present invention.

FIG. 3 is a graph showing the X-ray diffraction pattern of 400 Å NiNb films deposited on glass substrates.

FIG. 4 is a graph showing Hr and SMNR dependence on NiNb thickness of the media with surface-oxidized NiNb sealing layers (NiNbOx) and non-oxidized NiNb sealing layers.

FIG. 5 is a graph showing $PW_{50}$ and jitter dependence on NiNb thickness of the media with surface-oxidized NiNb sealing layers (NiNbOx) and non-oxidized NiNb sealing layers.

FIG. 6 is TEM diffraction pattern of 400 Å NiNb films deposited on glass substrates.

DESCRIPTION OF THE INVENTION

The present invention enables the manufacture of magnetic recording media exhibiting low Li migration and suitable for high density longitudinal and perpendicular magnetic recording employing a glass or glass-ceramic substrate having high $Li_2O$ concentrations, e.g., about 0.5 to about 32 wt. %, preferably about 5 to about 15 wt. %, most preferably about 8 to 11 wt. %. $Li_2O$ in glass or glass-ceramic substrates advantageously reduce the glass transition temperature. As a result, the utility of such recording media is expanded to extreme environments, including high temperature humidity environments. This objective is achieved in accordance with embodiments of the present invention by strategically forming a sealing layer on the glass or glass-ceramic substrate containing the high Li concentration or by forming a sealing means for substantially preventing the migration of Li from the substrate.

A sealing layer or the sealing means prevents leaching of Li from the substrates. The sealing layer or the sealing means can function as a seed layer when the layer affects the magnetic properties of the media. A sealing layer or a sealing means is a layer that can reduce Li concentration on the surface of the magnetic media to less than 500 counts/minute by the time-of-flight secondary ion mass spectroscopy (TOF-SIMS) method as follows. After the disc media are sputter-deposited, about 15 Å of lubricant was applied onto the surfaces of the discs. The discs were sent into a chamber in the environment of 60° C. and 80% relative humidity (RH) for 4 days, then were analyzed with TOF-SIMS. The surface concentration of lithium is used as disc corrosion criteria and is expressed in $\mu$g/disc or counts/minute.

Embodiments of the substrate comprising Li is a glass or glass-ceramic substrate. Embodiments of the sealing layer and the sealing means include sputter deposited NiNb, preferably amorphous NiNb, layer on the glass or glass-ceramic substrate. The sputter deposited NiNb layer prevents Li migration from the glass or glass-ceramic substrate.

The exact mechanism underpinning sealing of Li to the substrate employing an amorphous layer is not known with certainty. However, it is believed that Li migration is substantially prevented by denying Li ions access to grain boundaries, which are high diffusion paths. An amorphous layer and a single-crystal type layer are substantially devoid of grain boundaries and, hence, could provide effective sealing of Li from the substrate. While an amorphous NiNb layer is the preferred embodiment, any NiNb layer that could substantially prevent the migration of Li from the substrate could be employed in this invention.

The sealing layer or layers can advantageously be deposited at a total thickness of about 100 Å to about 1,000 Å, such as about 200 Å to about 600 Å, preferably about 400 Å to about 450 Å. The amorphous NiNb sealing layer can be sputter deposited employing a target containing at least about 12 wt. % of Nb and, optionally, one or more elements such as B, W, Ta, Zr and P. The preferred ranges of Ni, Nb, B, W, Ta, Zr and P, etc. in the target are as follows. Ni: 12 to 72 wt. %, preferably, 37 to 62 wt. %, more preferably, 51 to 62 wt. %; and for one or more combinations of elements from B, W, Ta, Zr and P the preferred range is 0.1 to 5 wt. %; the balance is Ni. Other materials instead of NiNb could be FeNb, NiP and FeP.

Embodiments of the present invention also comprises surface oxidizing the surface of layer to achieve superior recording performance, particularly for longitudinal magnetic recording. Both surface-oxidized and non-oxidized amorphous NiNb sealing layers significantly reduce Li leaching. A surface-oxidized layer is one having more than 0.5 at. % oxygen in a top 50 Å region after in-situ sputter removal of a 40 Å surface layer. In a preferred embodiment, the surface-oxidized layer has more than 10 at. % oxygen in the top 50 Å region after in-situ sputter removal of a 40 Å surface layer.

Embodiments of the present invention also comprise forming an adhesion enhancement layer, such as Cr or Cr alloy, between the amorphous NiNb sealing layer and substrate for improved adhesion of the amorphous NiNb sealing layer to the underlying substrate without reducing the sealing effect of the amorphous NiNb sealing layer.

Embodiments of the present invention also comprise depositing an underlayer on the NiNb sealing layer or layers, such as a Cr or Cr alloy, e.g., chromium vanadium (CrV), depositing a magnetic layer on the underlayer, such as a Co alloy, e.g., an alloy of Co, Cr, platinum and tantalum (CoCrPtTa), and a carbon-containing overcoat thereon, such as hydrogenated carbon. As in conventional practices, a lubricant topcoat can be applied on the carbon-containing overcoat.

Advantageously, the present invention enables the manufacture of magnetic recording media on glass or glass ceramic substrate with a large amount of Li which causes a reduced glass transition temperature, and enables the use of such magnetic recording media under extreme environmental conditions, including high temperature and high humidity. This objective is achieved in accordance with various embodiments of the present invention by depositing an adhesion enhancement layer between the substrate and the amorphous NiNb sealing layer, e.g., by depositing an adhesion enhancement layer directly on the substrate and depositing the amorphous NiNb sealing layer directly on the adhesion enhancement layer.

An adhesion enhancement layer is a sputter-deposited thin film layer in the thickness range of 15 Å to 200 Å and has better adhesion with the substrate than the layer otherwise directly deposited on the substrate, such as a seed layer, a sealing layer and an underlayer. More force is needed to peel-off the magnetic media with adhesion enhancement layer than the force to peel-off otherwise identically deposited magnetic media, but without the said adhesion enhancement layer. In a preferred embodiment, the adhesion enhancement layer is a sputter-deposited thin film layer in the thickness range of 25 Å to 75 Å.

Embodiments of the present invention comprise sputter-depositing an adhesion enhancement layer which is substantially Cr or a Cr alloy. Suitable Cr alloys include Cr and up to about 30 at. %, e.g., up to about 20 at. % of an alloying element, such as titanium and vanadium. Advantageously, the present invention can be easily integrated into existing production facilities in a cost effective manner, in that the adhesion enhancement and amorphous sealing layer can be sputter deposited.

The crystallographic orientation and morphology of a film deposited on another film depends upon the crystallographic orientation and morphology of the underlying film. In accordance with the present invention, the use of adhesion enhancement layer deposited between the amorphous NiNb sealing layer and the underlying glass or glass-ceramic substrate, does not substantially alter the advantageous crystallographic orientation and low noise of the magnetic recording medium even in embodiments wherein the surface of the amorphous NiNb sealing layer is oxidized.

In embodiments of the present invention, the amorphous NiNb sealing layer is surface-oxidized employing the methodology disclosed in U.S. Pat. No. 5,733,370. The resulting magnetic media is robust and exhibits superior recording characteristics, suitable for high-density longitudinal magnetic recording.

An embodiment of the present invention is schematically illustrated in FIG. 2 and comprises a glass or glass-ceramic substrate 20 containing about 10.5 wt. % $Li_2O$. Sequentially deposited on each side of substrate 20 are amorphous NiNb sealing layer 21, 21', underlayer 22, 22', magnetic layer 23, 23' and protective overcoat 24, 24'. Embodiments of the present invention also include a lubricant topcoat (not shown) deposited on protective overcoat 24, 24'.

Underlayer 22, at a thickness of about 20 to 800 Å, preferably about 25 to 200 Å, can comprise Cr or an alloy thereof, such as CrV. Suitable magnetic layers include Co layers, such as a CoCrPtTa alloy at a thickness of about 100 to 300 Å, preferably about 155 to 200 Å. Suitable materials for protective overcoat 25, at a thickness of about 25 to 125 Å, preferably about 30 to 75 Å, include a hydrogenated carbonated film. A Cr or Cr alloy adhesion enhancement layer can optionally be deposited between amorphous NiNb sealing layer 21, 21', at a thickness of about 100 to 1000 Å, preferably about 200 to 600 Å, and substrate 20, to improve the adhesion of the amorphous NiNb sealing layer without affecting the crystallographic orientation of the underlayer and the magnetic layer.

Advantageously, the present invention can be conducted by sputter depositing the adhesion enhancement layer, amorphous sealing layer, underlayer, magnetic layer and protective overcoat in an in-line pass-by apparatus comprising a plurality of sequentially spaced sputtering chambers.

EXAMPLES

More than 200 Å of sputter-deposited NiNb amorphous films have good adhesion, and significantly reduce lithium migration. Other films, which constitute the conventional longitudinal and perpendicular magnetic recording media, can be deposited on the NiNb films. The longitudinal magnetic films deposited on oxidized NiNb sealing layers have very good recording performances. All samples were fabricated with direct current (DC) magnetron sputtering except carbon films, which were made with alternative current (AC) magnetron sputtering in a pass-by in-line sputtering machine. The lithium on the surfaces of the rigid magnetic discs was measured with the TOF-SIMS method discussed above and the results are shown in Table 1.

TABLE I

Lithium concentration on disc surfaces measured with TOF-SIMS

| NiNb thickness (Å) | Li (cts./min) | | Li ($\mu$g/disc) | |
|---|---|---|---|---|
| | NiNbOx/ CrMo | NiNbOx/NiAl/ CrMO | NiNbOx/ CrMo | NiNb/NiAl/ CrMo |
| 0 | 2700 | 120 | 0.030 | 0.001 |
| 50 | 900 | | 0.010 | |
| 100 | 300 | | 0.003 | |
| 200 | 0 | 0 | 0 | 0 |
| 400 | 0 | | 0 | |
| 1000 | 0 | 0 | 0 | 0 |

Table I shows the results of TOF-SIMS measurement of 330 Å CrMo/200 Å CoCrPtTaNb/100 Å carbon deposited on surface-oxidized NiNb films, labeled as NiNbOx/CrMo, and 467 Å NiAl/25 Å CrMo/200 Å CoCrPtTaNb/100 Å carbon deposited on surface-oxidized NiNb films, labeled as NiNbOx/NiAl/CrMo. The film composition in atomic percent is expressed with the subscript as $Ni_{50}Al_{50}$, $Ni_{59.5}Nb_{40.5}$, $Cr_{90}Mo_{10}$, and $Co_{71}Cr_{17}Pt_8Ta_2Nb_2$. Table I shows that 200 Å of NiNb films are sufficient to reduce lithium migration to an acceptable level. FIG. 3 shows X-ray diffraction pattern of 400 Å of NiNb films deposited on glass substrates. No any diffraction peaks were observed in the two-theta range of 30 to 100 degrees. FIG. 6 shows transmission electron microscopy (TEM) diffraction pattern of the film shown in FIG. 3. FIG. 6 shows that the NiNb films are amorphous.

400 Å of NiP films deposited on Ohara glass-ceramic substrates failed peel-off test with Scotch tape. Ohara glass-ceramic substrates are commercially available from Ohara Incorporated of Kanagawa, Japan. 400 Å of NiNb films deposited on Ohara glass-ceramic substrates did not fail the peel-off test with Scotch tape. The adhesion of NiNb on glass is much better than that of NiP on glass.

FIG. 4 compares magnetic properties of NiAl/CrMo/ $Co_{66}Cr_{20}Pt_{10}Ta_2Nb_2$ films deposited on surface-oxidized and non-oxidized NiNb films on Ohara glass-ceramic substrates. Remanent coercivity (Hr) was measured with a rotating disc magnetometer (RDM). Signal to medium noise ratio (SMNR) was measured at 360 kfci. The figure demonstrates that the films deposited on surface-oxidized NiNb sealing layers have much higher coercivity and SMNR than the media with non-oxidized NiNb sealing layers.

FIG. 5 compares PW50 and jitter of these two kinds of media. The media with surface-oxidized NiNb sealing layers have much narrower PW50 and smaller jitter than that of the media with non-oxidized sealing layers.

FIGS. 3–5 convey clearly to those skilled in the art that the applicants invented the complete ranges disclosed in these figures. Applicants might seek to protect by their claims any part of the invention described in the specification.

Table II compares magnetic properties and recording performances of three kinds of glass media, NiAl/40 Å CrMo/260 Å $Co_{66}Cr_{20}Pt_{10}Ta_2Nb_2$/75 Å carbon films deposited on surface-oxidized 100 Å NiAl, and surface-oxidized 100 Å NiNb, and 80 Å CrMo/260 Å $Co_{66}Cr_{20}Pt_{10}Ta_2Nb_2$/75 Å carbon films deposited on non-oxidized Cr films, the conventional media. NiAl thickness is 290 Å for "A" sides and 550 Å for "B" sides. Cr thickness is 300 Å for "A" sides and 250 Å for "B" sides. The table shows that the media with surface-oxidized NiNb and surface-oxidized NiAl have similar recording performances, which are much better than those of the conventional media with Cr films directly deposited on the glass substrates.

TABLE II

Magnetic properties of NiAl/CrMo/Co-alloy on surface-oxidized NiAl, and NiNb, and CrMo/Co-alloy on Cr films.

| Seed layer | Hr(A) Oe | Hr(B) Oe | SMNR(A) dB | SMNR(B) dB | Jitter(A) μ" | Jitter(B) μ" | PW50(A) μ" | PW50(B) μ" |
|---|---|---|---|---|---|---|---|---|
| NiNbOx | 2394 | 2591 | 17.8 | 17.77 | 0.168 | 0.159 | 8.2 | 8.17 |
| NiAlOx | 2450 | 2635 | 17.6 | 17.94 | 0.17 | 0.158 | 8.18 | 8.155 |
| Cr | 2121 | 2196 | 7.2 | 7.7 | 0.455 | 0.472 | 9.15 | 9.21 |

Table III shows the data represented graphically in FIGS. 4 and 5.

TABLE III

Data represented graphically in FIGS. 4 and 5

| NiNb deposition power (kW) | NiNb thickness (Å) | Hr-NiNbOx | Hr-NiNb | SMNR-NiNbOx | SMNR-NiNb | Jitter-NiNbOx | Jitter-NiNb | PW50-NiNbOx | PW50-NiNb |
|---|---|---|---|---|---|---|---|---|---|
| 0 | 0 | 2534 | 2534 | 18.35 | 18.35 | 0.155 | 0.155 | 8.15 | 8.15 |
| 0.2 | 23.7 | 2528 | 2450 | 18.3 | 17.72 | 0.161 | 0.165 | 8.17 | 8.33 |
| 0.5 | 59.2 | 2459 | 2261 | 18 | 16.49 | 0.168 | 0.183 | 8.22 | 8.39 |
| 1 | 118.3 | 2492 | 2210 | 18.1 | 16.49 | 0.16 | 0.186 | 8.16 | 8.43 |
| 2 | 236.7 | 2430 | 2128 | 17.48 | 16.25 | 0.165 | 0.193 | 8.24 | 8.42 |
| 4 | 473.3 | 2527 | 2120.5 | 18.23 | 16.02 | 0.156 | 0.198 | 8.18 | 8.49 |

In summary, sputter-deposited amorphous NiNb films have good adhesion with glass substrates, and significantly reduce lithium migration. The magnetic recording films on oxidized NiNb films have good recording performances. NiNb is a good sealing layer materials and can be used as pre-coat for laser texture and mechanical texture process.

What is claimed is:

1. A longitudinal or perpendicular magnetic recording medium comprising, in this order:
    a glass or glass-ceramic substrate comprising Li;
    a sealing layer comprising substantially amorphous NiNb directly deposited on the glass or glass-ceramic substrate; and
    a magnetic layer,
    wherein the sealing layer has a thickness of about 450 Å or less and substantially prevents migration of Li from the substrate to the magnetic layer of the magnetic recording medium.

2. The magnetic medium according to claim 1, further comprising:
    an underlayer between the sealing layer and the magnetic layer; and
    a protective overcoat on the magnetic layer,
    wherein the substrate comprises about 0.5 to about 32 wt. % lithium oxide ($Li_2O$).

3. The magnetic recording medium according to claim 1, wherein the surface of the sealing layer is oxidized.

4. The magnetic recording medium according to claim 1, wherein the NiNb sealing layer further comprises about 0.1 wt. % to about 5 wt. % of a material selected from the group consisting of boron, tungsten, tantalum, zirconium and phosphorus.

5. The magnetic recording medium to claim further comprising a chromium-vanadium underlayer on the sealing layer, wherein the magnetic layer comprises an alloy of Co, Cr, Pt and Ta.

6. The magnetic medium according to claim 1, wherein the substrate comprises about 10.5 to about 32 wt. % lithium oxide ($Li_2O$).

7. A method of manufacturing a longitudinal or perpendicular magnetic recording medium, the method comprising:
    sputter depositing a sealing layer comprising substantially amorphous NiNb directly an a glass or glass-ceramic substrate comprising Li; and
    sputter depositing a magnetic layer on the sealing layer;
    wherein the sealing layer has a thickness of about 450 Å or less and substantially prevents migration of Li from the substrate to the magnetic layer of the magnetic recording medium.

8. The method according to claim 7 further comprising:
    sputter depositing an underlayer on the sealing layer prior to said sputter depositing the magnetic layer; and sputter depositing a protective overcoat on the magnetic layer, wherein the substrate comprises about 0.5 to about 32 wt. % lithium oxide ($Li_2O$).

9. The method according to claim 7, further comprising oxidizing the surface of the sealing layer.

10. The method according to claim 7, wherein the amorphous NiNb sealing layer further comprises about 0.1 wt. % to about 5 wt. % of a material selected from the group consisting of boron, tungsten, tantalum, zirconium and phosphorus.

11. The method according to claim 7, comprising sputter depositing the scaling layer using a target comprising at least 12 wt. % Nb.

12. The method of claim 1, wherein the substrate comprises about 10.5 to about 32 wt. % lithium oxide ($Li_2O$).

13. A longitudinal or perpendicular magnetic recording medium comprising, in this order:

a glass or glass-ceramic substrate comprising Li;

a sealing means comprising NiNb directly on the substrate having a thickness of about 450 Å or less for substantially preventing migration of Li from the substrate to a magnetic layer of the magnetic recording medium; and the magnetic layer.

\* \* \* \* \*